Figure 1:
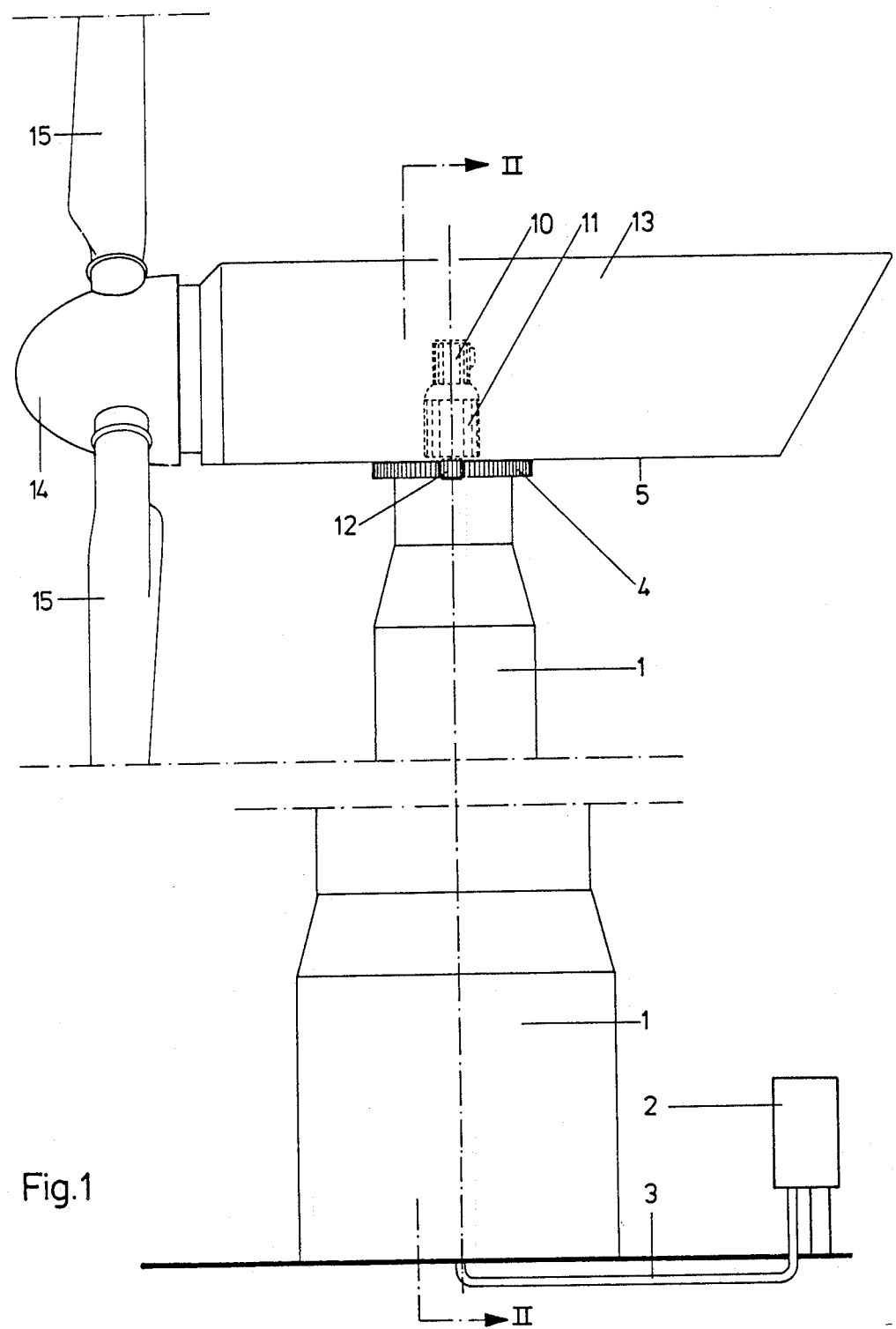

United States Patent [19]

Nielsen

[11] Patent Number: 4,966,525
[45] Date of Patent: Oct. 30, 1990

[54] YAWING DEVICE AND METHOD OF CONTROLLING IT

[76] Inventor: Erik Nielsen, Lindholmvej 28, 5250 Odense Sv, Denmark

[21] Appl. No.: 150,770

[22] Filed: Feb. 1, 1988

[51] Int. Cl.5 .............................................. F03D 7/04
[52] U.S. Cl. ........................................... 416/9; 416/1; 416/11; 290/44
[58] Field of Search ................ 74/381, 705; 416/9-11, 416/170 A, DIG. 6, DIG. 4, 14, 169 B; 290/44, 55; 318/373, 374, 375

[56] References Cited

U.S. PATENT DOCUMENTS

| | | | |
|---|---|---|---|
| 2,145,511 | 1/1939 | Grohmann | 416/DIG. 4 |
| 2,517,135 | 8/1950 | Rudisill | 416/9 X |
| 3,686,608 | 8/1972 | Wahlberg | 74/705 X |
| 4,408,954 | 10/1983 | Earle | 416/170 A X |
| 4,435,647 | 3/1984 | Harner et al. | 416/11 X |
| 4,527,072 | 7/1985 | Van Degeer | 416/DIG. 6 X |
| 4,557,666 | 12/1985 | Baskin et al. | 416/11 X |
| 4,585,950 | 4/1986 | Lund | 416/170 A X |
| 4,692,094 | 9/1987 | Kulinyak | 416/11 |

FOREIGN PATENT DOCUMENTS

| | | | |
|---|---|---|---|
| 83819 | 7/1983 | European Pat. Off. | 416/13 |
| 3008379 | 9/1981 | Fed. Rep. of Germany | 416/9 |
| 3515789 | 11/1986 | Fed. Rep. of Germany | 416/14 |
| 3516821 | 11/1986 | Fed. Rep. of Germany | 416/169 B |
| 478646 | 2/1953 | Italy | 416/DIG. 6 |
| 1048158 | 10/1983 | U.S.S.R. | 416/DIG. 4 |
| 1285186 | 1/1987 | U.S.S.R. | 416/14 |

Primary Examiner—John T. Kwon
Attorney, Agent, or Firm—Darby & Darby

[57] ABSTRACT

A windmill is provided with a yawing device which includes two or more gear motors disposed about the periphery of a stationary tower toothed rim. Each gear motor has a driving wheel attached at an end thereof for engaging the toothed rim. By applying a suitable current to the gear motors, in equal and opposite directions, the mill can be held at an optimum position, relative to the wind, at a low power consumption. The use of multiple motors also provides optimum reliability with smooth and even yawing action.

5 Claims, 2 Drawing Sheets

YAWING DEVICE AND METHOD OF CONTROLLING IT

The invention relates to a yawing device for rotating a windmill about a vertical yawing axis on a stationary base such as a tower, said mill being provided eith a yawing device which over a driving wheel is in mesh with a toothed rim fixedly attached at the top of the tower, and a method of controlling the yawing device.

Within the windmill industry it is of the greatest importance for efficient operation as well as safety purposes that the blades are always positioned in the wind. This is normally controlled by means of a microprocessor which receives a signal from a wind vane registering the wind direction and signals to a yawing device which will turn the mill and the blades so that they are correctly positioned relative to the direction of the wind.

The yawing device may be hydraulically or electrically driven. The hydraulic embodiment can comprise a reciprocating motor which engages the tower so that the mill itself, i.e. the blades, the mill shaft, the generators, the gear etc. can be brought to rotate relative to the tower. These hydraulic yawing devices are, however, expensive to fit and also require a complete hydraulic system in order to function. Add to this that this system must be in constant operation in order to be able to carry out the yawing motion.

An electrically driven yawing system usually comprises a gear motor which is disposed over a toothed gear which is in mesh with a toothed rim fixedly attached to the top of the tower. This device is, however, very vulnerable in that it cannot compensate for the wear which will gradually occur. This causes an inaccurate power transmission which also makes heavy demands on the braking device since this alone must hold the mill in its correct position.

It is the object of the invention to improve the known yawing devices by eliminating their shortcomings and disadvantages, and this is achieved by a device which comprises two or several driving wheels each attached to a gear motor.

This first of all provides a safer and more reliable yawing device which also operates very evenly and with minimum wear, since the individual motors require less power, and the more even distribution of the load provides a very gentle, even and safe yawing.

By providing the gear motor with a friction brake device, it will be possible to obtain a much more even braking and safe securing of the mill when this is not yawed.

This more even distribution of the braking power also improves safety considerably, and the usual continuous friction can be avoided.

By applying this method, a hitherto unknown reliable securing is obtained in that the torque fo the yawing devices can be reversed, whereby the mill can be held in position merely by means of these opposed torques.

Finally, it is expedient to use the friction brake in order to strengthen the fixing of the mill in its optimum operating position.

Figure 2:
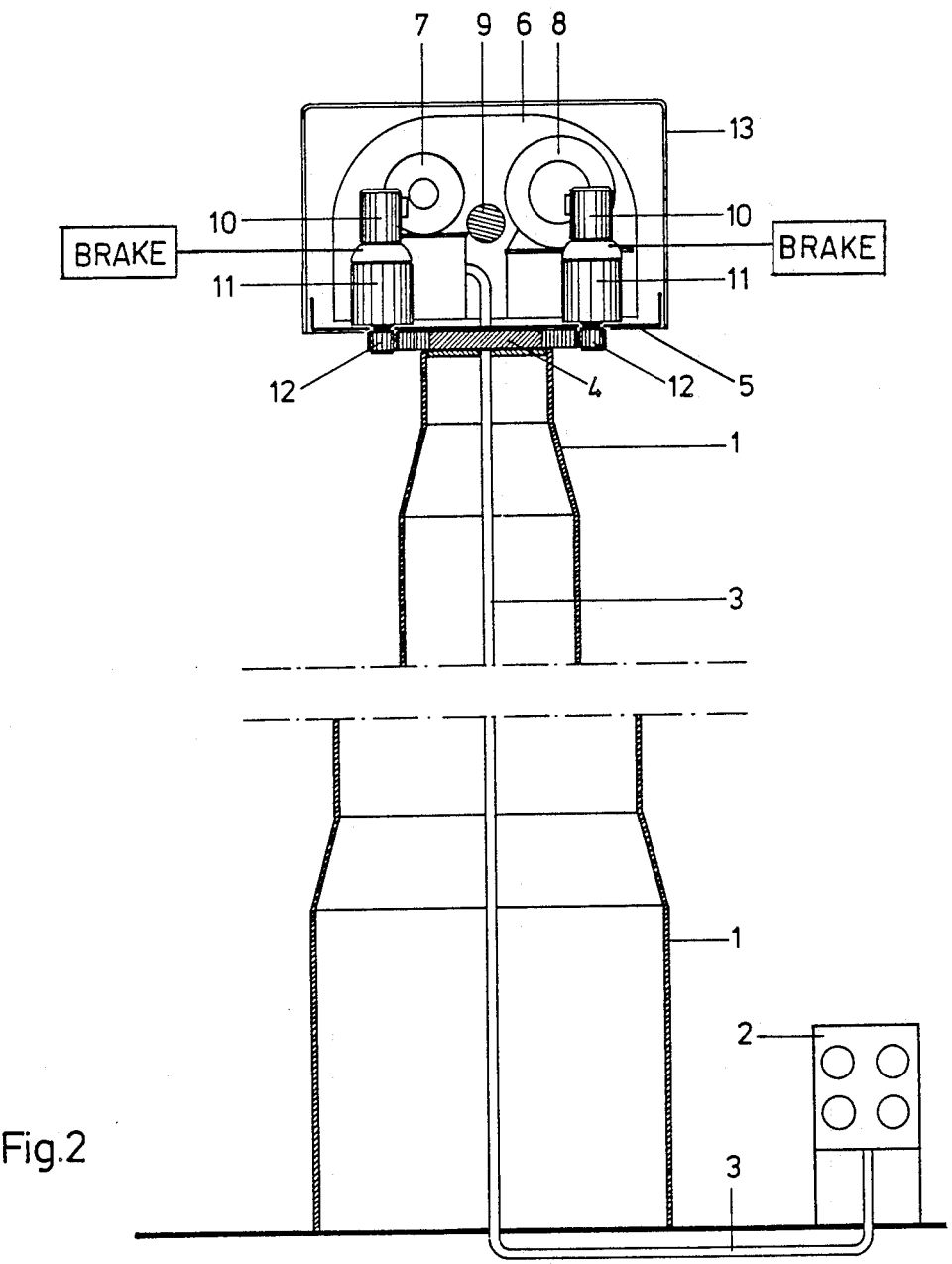

In the following the invention will be described in closer detail with reference to the drawing, wherein FIG. 1 is a side view of a mill on a tower, and FIG. 2 is a section through the mill and tower seen in the direction of II—II in FIG. 2.

The drawing shows an example of an embodiment of a yawing device fitted in a windmill on a tower.

In the shown example the tower 1 is a steel tower built of sections and having a generally known base.

Next to the tower 1 the control cabinet 2 is arranged, which comprises a microprocessor which among other things controls the yawing device.

A cable 3 connects the mill with the control cabinet and this also serves as production cable for the generators.

A stationary toothed rim 4 is fixed at the top of the tower1. Moreover, there is a support for the chassis or bottom 5 of the mill so that the mill can rotate relative to the tower. At the bottom 5 the mechanical parts are arranged. These are the rotor shaft 9 which in the front is attached to the base of the blades 15 and in the rear to the gear 6. The gear 6 is moreover attached to a smaller generator 7 and a larger generator 8, respectively, which produce electricity when the blades 15 are brought to rotate by the wind. This whole mechanism is enclosed in a front cap 14 and a hood 13.

For yawing the windmill two gear motors 10, are arranged. In the shown example two motors are fitted diametrically opposite each other in relation to the toothed rim 4 on the tower 1.

If more gear motors are arranged, these can advantageously be situated equidistantly in relation to the toothed rim 4 or arranged in a different manner according to the conditions in the windmill.

Each yawing motor comprises an electric motor 10 and a gear 11 as well as an electrically operated friction brake.

At the output shaft 12 of the fear 11 below the bottom 5 a toothed wheel 12 is arranged which is in mesh with the teeth of the toothed rim 4, as is seen from the drawing.

When operating the motors 10, the toothed wheels 12 will turn the entire mill in relation to the tower and thus enable the mill to be positioned relative to the wind.

If the mill is to be yawed, for instance if the direction of the wind has changed, a wind vane, which is not shown, gives a signal to the microprocessor 2 which in turn signals through the cable 3 to the individual yawing motors 10.

The signal deactivates the friction brakes and starts the motors so that the mill is turned to the required new position. Once this has been reached, a signal for actuating the friction brakes is given while at the same time a suitable current is applied to the motors so that they turn in opposite directions with equal force in order to stop the turning of the windmill.

The mill is hereby fixed in that the toothed wheels 12 mesh with the toothed rim 4 in that they exert an opposite directed torque.

The strength of this moment cna be adjusted to the conditions, such as especially outer stress and pressure on the mill in order to protect the friction brakes.

When the mill needs to be yawed again, the signals are repeated and ensure that a turning will always take place in the gentlest possible manner, and that the mill will be fixed in its correct position in the most effective manner. Moreover, this plant facilitates controlling so that the mill in an emergency can operate provided there is energy for motors and friction brake.

I claim:

1. A yawing device for rotating a windmill about a yawing axis, the windmill rotatable on a stationary tower base, said yawing device comprising:

a toothed rim fixedly attached to the stationary tower base;

at least two motors, each motor disposed separately about the periphery of the toothed rim, a driving wheel rotatably mounted to each gear motor, the driving wheels engaged with the toothed rim, each gear motor having a torque capacity which is applicable in an equal and opposite direction and amount to the torque applicable by the other gear motor such that the windmill is held in an operating position.

2. The yawing device of claim 1, further comprising at least two electrically driven friction brakes in engagement with the gear motors.

3. A method for controlling a yawing device for rotating a windmill about a yawing axis, the windmill rotatable on a stationery tower base, said yawing device in mesh with a toothed rim fixedly attached to the base, saie yawing device comprising two or more gear motors, each motor disposed separately about the periphery of the toothed rim, each gear motor having a driving wheel attached thereto, the driving wheels in mesh with the toothed rim, said method comprising; placing each gear motor (10, 11) in an idle position; and, applying a current to each gear motor which causes each drive wheel to have a torque which is equal and opposite to the torque of the other drive wheel to be applied thereto, such that the windmill is held in an operating position.

4. A method for controlling the yawing device of claim 3 further comprising providing each gear motor with an electrically driven friction brake.

5. Method according to claim 4 further comprising actuating the friction brake for fixing the mill.

* * * * *